United States Patent [19]

Mitsuda et al.

[11] Patent Number: 4,781,727
[45] Date of Patent: Nov. 1, 1988

[54] METHOD FOR GAS SEALING OF PHOSPHORIC ACID-TYPE FUEL CELL

[75] Inventors: Kenro Mitsuda; Hisashi Shiota; Kenzo Takahashi; Kozo Shimamoto; Toshiaki Murahashi; Ikuyuki Hirata, all of Hyogo, Japan

[73] Assignee: Mitsubishi Denki Kabushiki Kaisha, Tokyo, Japan

[21] Appl. No.: 146,027

[22] Filed: Jan. 20, 1988

[30] Foreign Application Priority Data

Jan. 21, 1987 [JP] Japan .................................. 62-12820

[51] Int. Cl.⁴ ............................................ H01M 2/08
[52] U.S. Cl. .................. 29/623.2; 29/623.5; 429/35
[58] Field of Search ......................... 429/41, 44, 40, 34, 429/35, 36; 427/113, 115; 29/623.2, 623.5

[56] References Cited

U.S. PATENT DOCUMENTS

| | | |
|---|---|---|
| 3,867,206 | 2/1975 | Trocciola et al. .................... 429/35 |
| 4,017,664 | 4/1977 | Breault .................................. 429/44 |
| 4,517,260 | 5/1985 | Mitsuda ................................ 429/41 |
| 4,529,671 | 7/1985 | Kahara et al. ........................ 429/41 |
| 4,623,415 | 11/1986 | Kahara et al. ..................... 429/44 X |
| 4,687,715 | 8/1987 | Michael ................................ 429/41 |
| 4,695,518 | 9/1987 | Trocciola et al. ................. 429/41 X |

Primary Examiner—Anthony Skapars
Attorney, Agent, or Firm—Bernard, Rothwell & Brown

[57] ABSTRACT

The invention relates to an improvement of the gas sealing at the periphery of the electrode base and separator which constitute the fuel cell. Provided herein is a method for sealing the gas of a phosphoric acid-type fuel cell which comprises filling the pores in the porous material periphery of the cell constituents with fine particles of at least one of silicon carbide and silicon nitride which have undergone surface oxidation treatment, and causing particles to expand in volume through the reaction of the surface oxide of the particles with hot phosphoric acid that yields phosphate compounds, thereby clogging the pores.

3 Claims, 6 Drawing Sheets

METHOD FOR GAS SEALING OF PHOSPHORIC ACID-TYPE FUEL CELL

BACKGROUND OF THE INVENTION

1. Field of the Invention

The present invention relates to a method for the gas sealing of a phosphoric acid-type fuel cell, and more particularly to an improvement of the gas sealing at the periphery of the electrode base and separator which constitute the fuel cell.

2. Description of the Prior Art

As known well, the phosphoric acid-type fuel cell is a device for generating electric power by the electrochemical reaction of an externally supplied fuel and oxidizing agent. Basically, it has two electrodes separated from each other by phosphoric acid which is an electrolyte and it operates at a temperature of 150 220°–220° C. under normal pressure to 10 atm.

For a phosphoric acid-type fuel cell, it is absolutely necessary and important to prevent the leakage of reaction gases inside and outside the cell. The leakage and mixing of reaction gases might lead to a serious accident. Effective and reliable tight sealing is important especially at the periphery of the electrode base and separator constituting the fuel cell.

One of the gas seal methods heretofore employed for the periphery of the electrode having the catalyst layer is wet sealing which is based on the capillary action of the electrolyte itself. This method is disclosed in Japanese Patent Publication No. 152/1983 (U.S. Pat. No. 3,867,206). According to this method, the periphery of the electrode base is filled with the electrolyte by the capillary action, taking advantage of the fact that the electrode base having the catalyst layer, which is used in a phosphoric acid-type fuel cell, is made of a gas-permeable porous carbon sheet. The periphery of the electrode base is filled with a filler such as tantalum, graphite, and polyarylsulfone to render it hydrophilic. The filler is intended to permit the periphery of the electrode to retain the electrolyte as much as desired. These fillers are not affected by the electrolyte. Silicon carbide (SiC) is a new filler which is in general use recently.

A disadvantage of the conventional wet seal is that it forfeits its sealing power at the wet sealing portion to a great extent when phosphoric acid is short and there occurs a pressure difference. Under such a situation, the phosphoric acid held by the filler easily flows out because it is highly fluid and mobile at the operating temperature and the operating pressure.

In order to overcome this disadvantage, the present applicant proposed a new sealing method. (See Japanese Patent Laid-open No. 13572/1986.) According to this method, the periphery of the electrode base is filled with a gel of phosphate compound to improve the sealing performance at the periphery of the electrode base. The phosphate compound enhances the capillary action and hence wettability on account of its powerful affinity for phosphoric acid. This method, however, does not eliminate the disadvantage that the gas sealing power at the wet seal part greatly decreases when phosphoric acid is short. In addition, this method involves a new problem that the phosphate compound in the wet seal part gradually dissolves in phosphoric acid and flows out into inner reservoir and outer reservoir, so that the phosphate compound finally disappears, with the result that the gas sealing performance becomes poor.

On the other hand, attempts have been made to apply the wet sealing to the periphery of the separator. An example is disclosed in Japanese Patent Laid-open No. 83360/1984. The application of wet sealing to the periphery of the porous reservoir plate having no catalyst layer is also disclosed in Japanese Pat. Application No. 210322/1986, "Fuel cell", filed by the present applicant on Sept. 4, 1986. In either cases, it was impossible to prevent the decrease of sealing power at the wet seal which occurs when phosphoric acid is short, so long as gas sealing resorts to the capillary action of liquid phosphoric acid.

SUMMARY OF THE INVENTION

The present invention is intended to solve the above-mentioned problems. Accordingly, it is an object of the present invention to provide a method for sealing the gas of a phosphoric acid-type fuel cell, said method being capable of retaining the sufficient gas sealing power at all times at the periphery of the cell constituents without being affected by the amount of phosphoric acid.

According to the method of the present invention, the gas sealing of a phosphoric acid-type fuel cell is accomplished by filling the pores in the porous material periphery of the cell constituents with fine particles of at least one of silicon carbide and silicon nitride which have undergone surface oxidation treatment, and causing particles to expand in volume through the reaction of the surface oxide of the particles with hot phosphoric acid that yields phosphate compounds, thereby clogging the pores.

Therefore, in the gas sealing method of the present invention, a reaction between the hot phosphoric acid and the surface oxidized fine particles is generated, and the silicon oxide of the surface of the fine article changes into phosphoric acid silicon compounds, then the pores of the porous material are clogged by the particle expansion and tight gas sealing not using the capillary action is obtained.

The method for gas sealing of phosphoric acid-type fuel cell of the present invention provides a tight gas seal which does not resort to the capillary action, because the particles swell to clog the pores of the porous material as the silicon oxide (or nitride) on the particle surface reacts with hot phosphoric acid to give phosphate compounds.

These and other objects and advantages of the invention may be readily ascertained by referring to the following description and appended drawings.

DETAILED DESCRIPTION OF THE PREFERRED EMBODIMENTS

What is important in the present invention is the swelling of surface-oxidized fine particles. This phenomenon is explained first with reference to the results of a series of experiments.

The fine particles of silicon carbide used in the experiments are known to be useful as a matrix material as disclosed in Japanese Patent Publication No. 156/1983 (U.S. Pat. No. 4,017,664). The fine particles of silicon nitride used in the experiments are also known to be useful as a matrix material as disclosed in Japanese Patent Laid-open No. 165264/1983 and Japanese Patent Laid-open No. 211968/1984 (U.S. Pat. No. 4,517,260) filed by the present applicant. They are known to have good corrosion resistance to phosphoric acid.

Experiment 1

Surface-oxidized silicon carbide was prepared from silicon carbide as a raw material having a nominal average particle diameter of 1 μm (#8000 produced by Fujimi Kemmazai Co., Ltd.) by heating the raw material in an oxidizing atmosphere at 1000° C. for 15 minutes.

Figure 2:
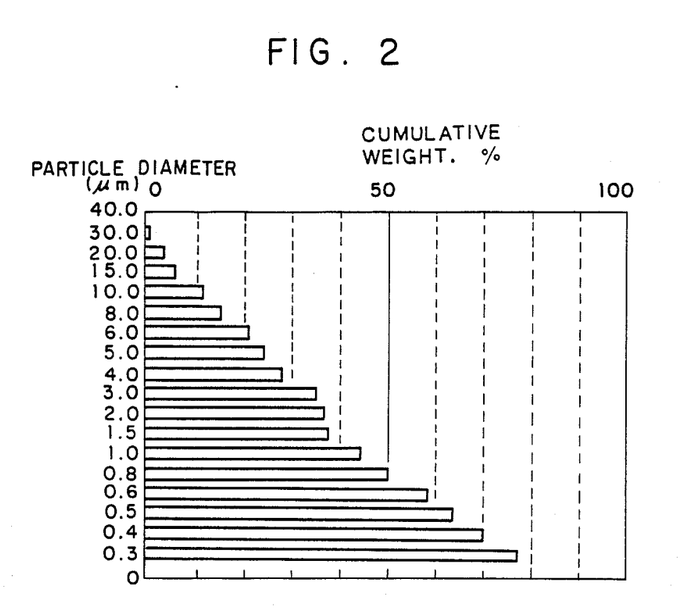
FIG. 2 is a graph showing the particle size distribution of raw material SiC powder.
Figure 3:
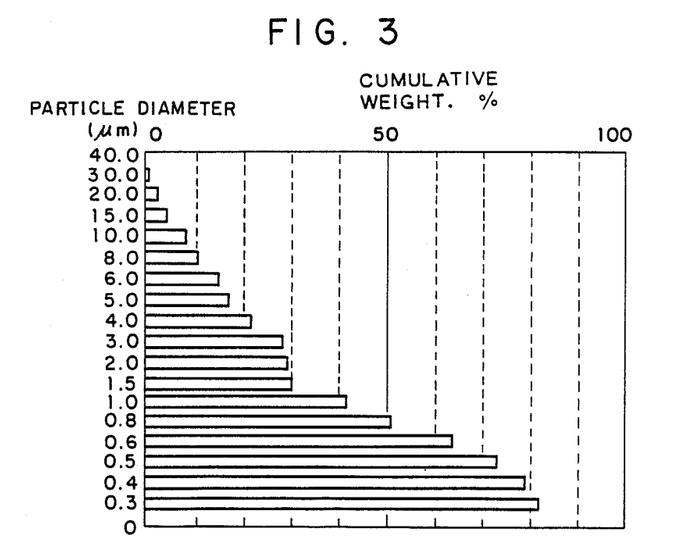
FIG. 3 is a graph showing the particle size distribution of surface-oxidized SiC powder.

The particle diameter of the raw material SiC powder and surface-oxidized SiC powder was measured by the combination of gravitational sedimentation and centrifugal sedimentation (at 4800 rpm) using a centrifugal sedimentation particle size distribution measuring apparatus, Model SA-CP3, made by Shimadzu Seisakusho Ltd. The results are shown in FIGS. 2 and 3. The average particle diameter of raw material SiC powder was 0.82 μm and the average particle diameter of surface-oxidized SiC powder was 0.83 μm. This result indicates that the particle diameter increases very little upon surface oxidation.

Experiment 2

Figure 4:
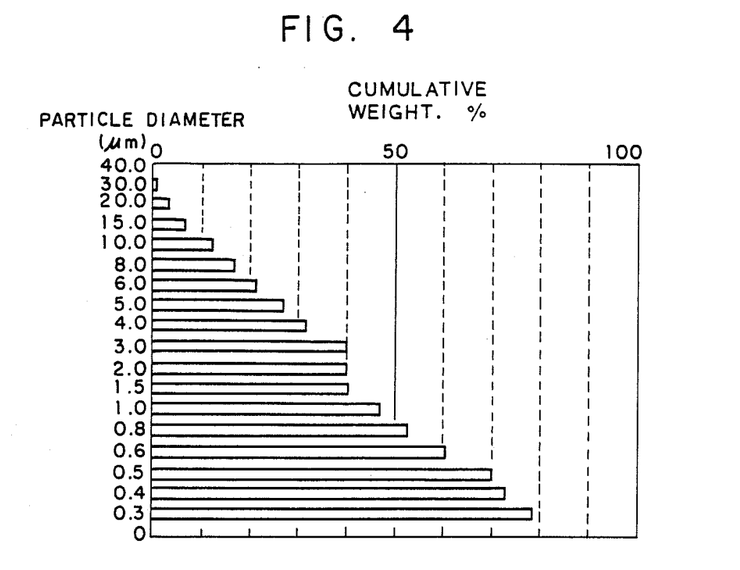
FIG. 4 is a graph showing the particle size distribution of raw material SiC powder which has been treated with hot phosphoric acid.
Figure 5:
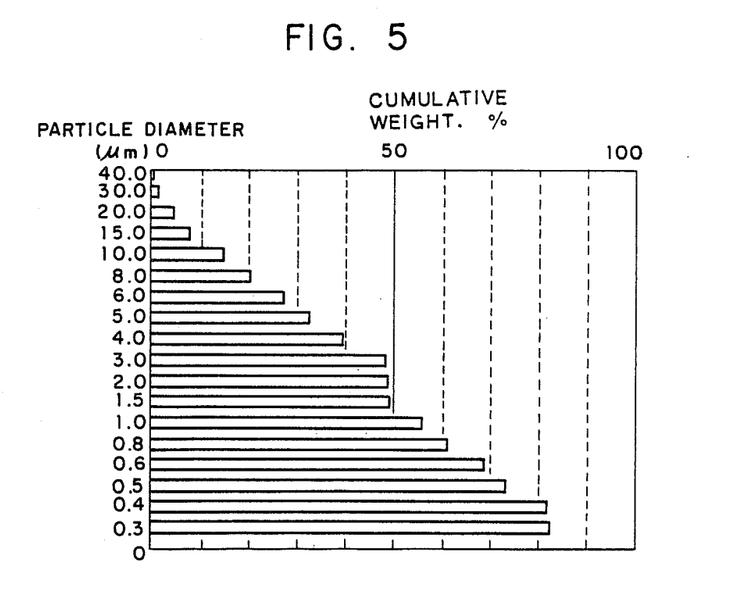
FIG. 5 is a graph showing the particle size distribution of surface-oxidized SiC powder which has been treated with hot phosphoric acid.

The same raw material SiC powder and surface-oxidized SiC powder as used in Experiment 1 were immersed in 105 wt % $H_3PO_4$ (made by Rasa Industries, Ltd.) at 190° C. for 40 hours. After the treatment with hot phosphoric acid, the particle size distribution of the raw material SiC powder and surface-oxidized SiC powder was measured in the same manner as in Experiment 1. The results are shown in FIGS. 4 and 5. In the case of raw material SiC powder, the average particle diameter slightly increased from 0.82 μm to 0.93 μm after the treatment with hot phosphoric acid. By contrast, in the case of surface-oxidized SiC powder, the average particle diameter increased almost twice from 0.83 μm to 1.48 μm.

Experiment 3

The same procedure as in Experiments 1 and 2 was repeated except that the oxidation of silicon carbide was performed at 1000° C. for 30 minutes and at 1000° C. for 60 minutes. It was confirmed that the treatment with hot phosphoric acid brings similar swelling.

Experiment 4

The same procedure as in Experiments 1 and 2 was carried out for silicon nitride having a nominal average particle diameter of 1 μm (SN-9S, α-$Si_3N_4$, made by Denki Kagaku Kogyo Co., Ltd.). It was confirmed that the treatment with hot phosphoric acid brings similar swelling.

Experiment 5

The surface-oxidized SiC powder used in Experiment 1 is made into a 200-μm thick matrix layer by incorporating 3 wt % of polytetrafluroethylene as a binder. The matrix layer (measuring 5 cm by 5 cm) was immersed in phosphoric acid at 190° C. overnight. As the result of immersion, the matrix layer increased in size (5.5 mm by 5.5 mm). In other words, the swelling by the reaction of surface-oxidized SiC with phosphoric acid was visually confirmed.

Figure 6:
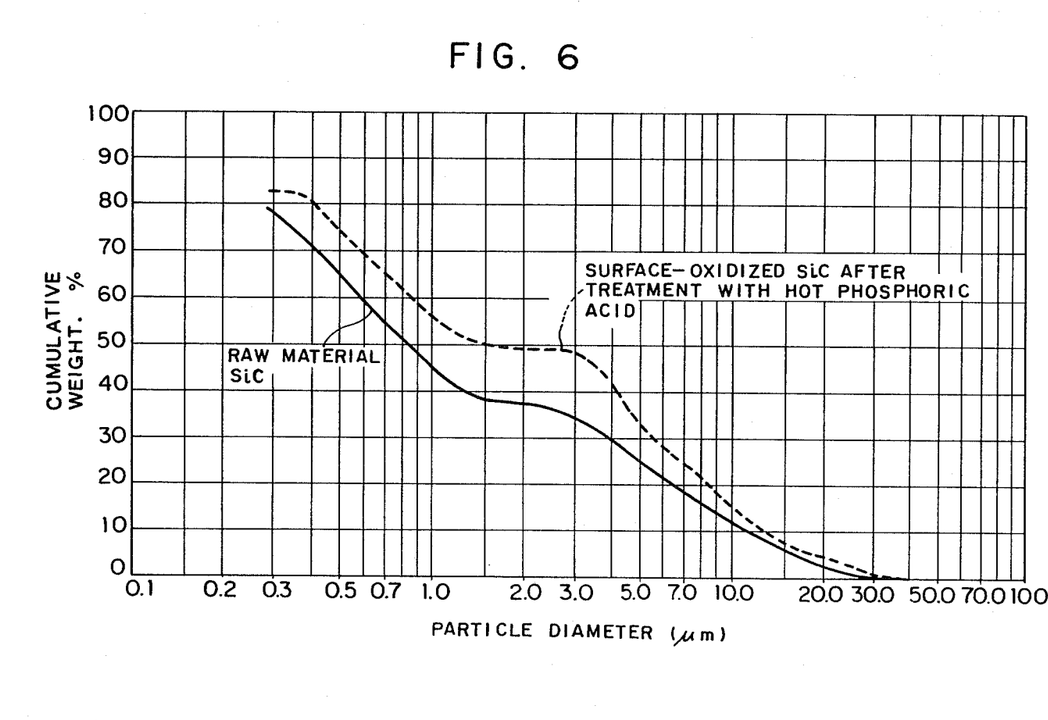
FIG. 6 is a graph showing the particle size distribution of raw material SiC powder and surface-oxidized SiC powder which has been treated with hot phosphoric acid.

The increase of particle diameter of surface-oxidized SiC powder by the treatment with hot phosphoric acid is apparently noted from FIG. 6 which was prepared by interposing FIG. 2 (showing the particle size distribution of raw material SiC powder) and FIG. 5 (showing the particle size distribution of surface-oxidized SiC powder treated with phosphoric acid).

Figure 7:
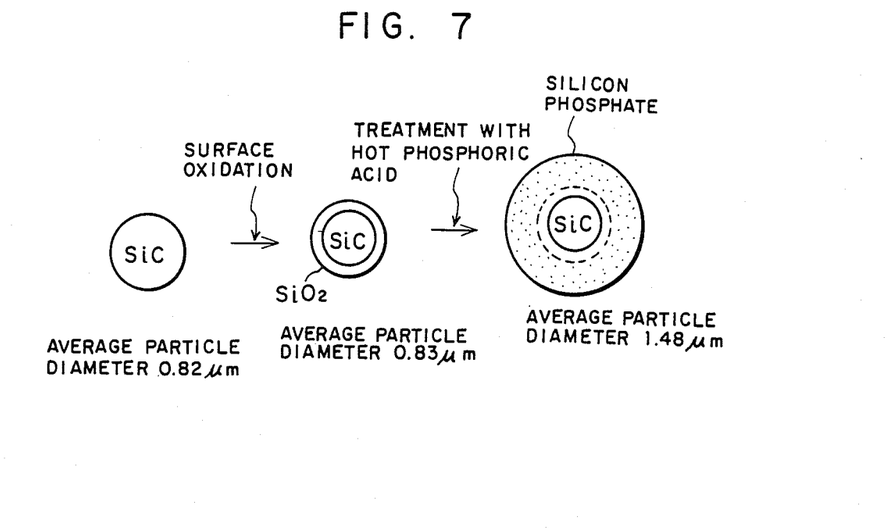
FIG. 7 is a schematic diagram showing how raw material SiC powder changes in particle diameter as it undergoes surface oxidation and hot phosphoric acid treatment.

The increase of particle diameter observed in Experiments 1 and 2 is illustrated in FIG. 7. The surface oxidation brings about the following oxidation reactions on the surface of SiC powder or $Si_3N_4$ powder.

The oxidation reaction forms a silicon oxide film on the surface of the particles. Upon treatment with hot phosphoric acid, the silicon oxide reacts with phosphoric acid to bring silicon phosphate ($SiP_2O_7$). The formation of silicon phosphate is considered to be the cause of swelling. The above-mentioned experimental results gave the present inventor a hint that the swelling property might be utilized for gas sealing. This hint led to the present invention.

Figure 8:
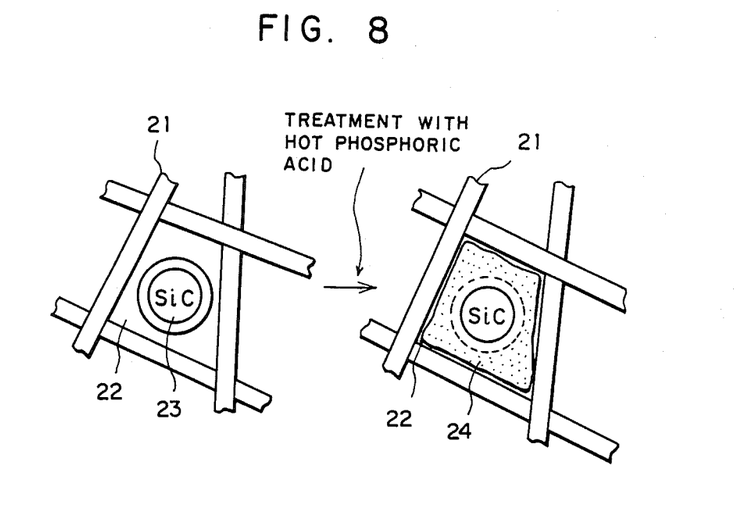
FIG. 8 is a schematic diagram showing how gas sealing accomplished by the embodiment of the invention.

The application of the swelling property to gas sealing is illustrated in FIG. 8. In FIG. 8, there are shown a carbon base fiber 21 constituting the porous base material, a pore 22 of the porous base material, a surface-oxidized SiC particle 23, and a phosphate compound 24.

A particle to fill a pore of the porous base material should naturally have a diameter smaller than the pore size. Even though a particle tightly fits into a pore, there still remains a gap between the particle 23 and the fiber 21 of the base material. As the result, the pore becomes smaller than before filling, then, the space increases the capillary force and it is still necessary to perform wet sealing with electrolyte by the aid of capillary action in order to achieve the gas sealing. If the particle swells twice in diameter after filling, the particle volume is more than five times the original volume. In other words, if a particle placed in a pore has a volume larger than 20% of the pore volume, the particle 24 will completely fill the pore after swelling. In such a situation, the wet sealing with electrolyte would not be necessary any longer.

Incidentally, in FIG. 8, one particle fits into one pore just for illustrating; but in actual, several tens of particles fill a pore because the particle diameter is about 1 $\mu$m, whereas the pore size is 20 to 30 $\mu$m.

Figure 1:
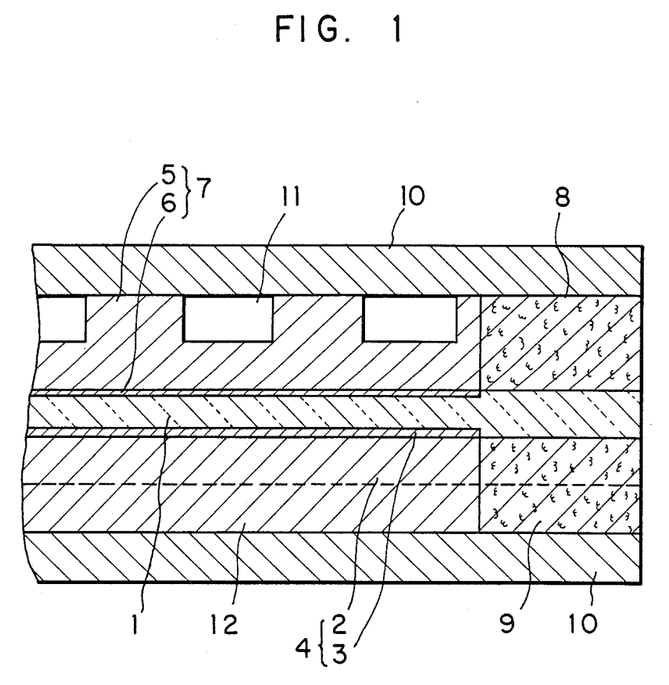
FIG. 1 is a sectional view showing major parts of a phosphoric acid-type fuel cell which is obtained by an embodiment of the gas sealing method of the present invention.

An embodiment of the present invention is described with reference to FIG. 1 which is a sectional view showing a phosphoric acid-type fuel cell provided with the gas seal according to the present invention. There are shown an electrolyte matrix 1, an electrode base material 2, 5, a catalyst layer 3, 6, a fuel column 4, an air electrode 7, a reaction gas passage 11, 12, a separator 10, and a peripheral gas seal 8, 9. According to the present invention, the gas seal is achieved, without resorting to wet seal, by filling the peripheral gas seal 8, 9 with surface-oxidized SiC or $Si_3N_4$ powder and subsequently performing the treatment with hot phosphoric acid. The gas sealing method of the present invention can be applied not only to the electrode base material 2 with the catalyst layer 3 formed thereon but also to the peripheral gas seal of the reservoir plate and separator 10.

The performance of the gas seal according to the invention was compared with that of a conventional one by measuring the flow rate of nitrogen leaking from the seal similar to that shown in FIG. 1 in Experiments 6 and 7 explained below.

Experiment 6

(Conventional example)

Figure 9:
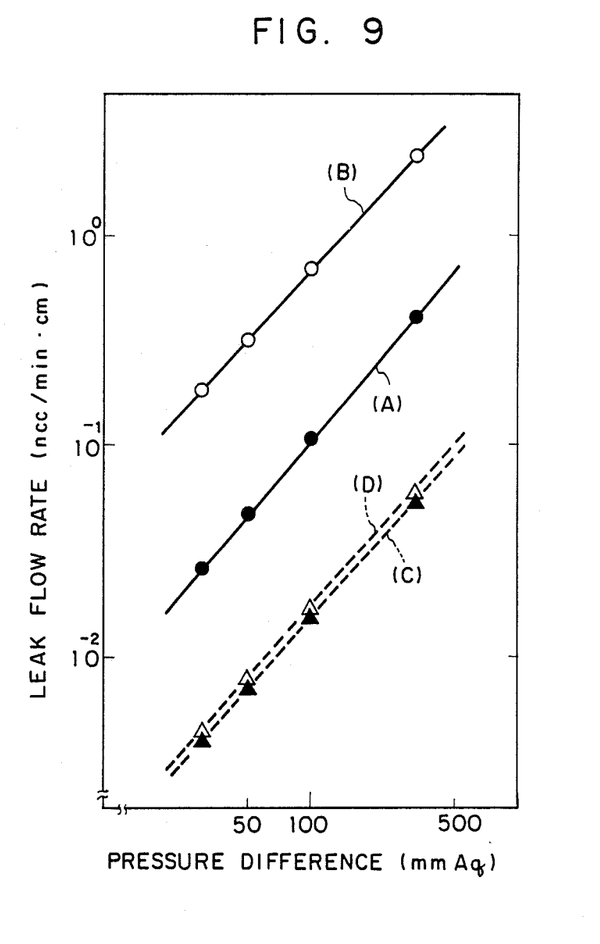
FIG. 9 is a graph showing the flow rate of gas leakage plotted against the pressure difference measured at different gas seal parts obtained by the prior art and the embodiment of the present invention with or without phosphoric acid.

A test piece was prepared from a carbon fiber substrate measuring 15 cm by 15 cm and 1.8 mm thick, KES-400, made by Kureha Chemical Industry Co., Ltd. The substrate has a porosity of 60% and an average pore diameter of 35 $\mu$m. That portion of the test piece which is 2 cm wide along the four sides was filled with SiC powder (#8000) having an average particle diameter of 1 $\mu$m according to the conventional method. (The total length of the seal thus formed is 60 cm.) The filled portion was impregnated with phosphoric acid, followed by standing at 190° C. for 24 hours. With the test piece held between carbon plates under a pressure of 2 kg/cm$^2$ at 190° C., nitrogen gas was supplied to the test piece through a gas passage formed at the center of the substrate to the carbon plate. The amount of nitrogen gas which leaks through the seal was measured at varied pressure differences between inside and outside. The results are indicated by the solid line A (with black circular marks) in FIG. 9. Subsequently, the test piece was washed with sodium hydrogencarbonate to remove phosphoric acid. The leaking flow rate was measured again in the same manner as above. The results are indicated by the solid line B (with white circular marks) in FIG. 9. Incidentally, the filling ratio of the SiC powder in the substrate was 23 vol %.

Experiment 7

(Example according to the invention)

The experiment was carried out with the same substrate as used in Experiment 6. The substrate was filled with the same surface-oxidized SiC powder as used in Experiment 1. The filled portion was impregnated with phosphoric acid, followed by standing at 190° C. for 24 hours. With the test piece held between carbon plates under a pressure of 2 kg/cm$^2$ at 190° C., the leaking flow rate of nitrogen gas was measured in the same manner as in Experiment 6. The results are indicated by the broken line C (with black triangular marks) in FIG. 9. Subsequently, the test piece was washed with sodium hydrogencarbonate to remove phosphoric acid. The leaking flow rate was measured again. The results are indicated by the solid line D (with white rectangular marks) in FIG. 9. Incidentally, the filling ratio of the surface-oxidized SiC in the substrate was 22 vol %.

In Experiment 6, the leaking flow rate extremely increased after the removal of phosphoric acid. This suggests that the gas sealing was achieved by the wetting with phosphoric acid. By contrast, in Experiment 7, the leaking flow rate changed very little before and after the neutralization of phosphoric acid [See (C) and (D)]. It should be noted that the gas seal performance of the present invention was better than that of wet seal with phosphoric acid of the prior art. These results support the hypothesis illustrated in FIGS. 7 and 8 and indicate that good gas seal can be achieved without resorting to phosphoric acid.

The treatment of surface-oxidized SiC powder with hot phosphoric acid can be accomplished simply by immersing the cell in phosphoric acid before operation or by impregnating the cell with phosphoric acid during operation. The surface-oxidized SiC powder slowly reacts with phosphoric acid during operation, producing a gas seal of outstanding performance. After the completion of the reaction, the gas seal performance is retained even when phosphoric acid in the cell is short.

The same effect as mentioned above can be produced with surface-oxidized $Si_3N_4$ powder as indicated by the results of Experiment 4. In the meantime, in case of using oxides such as $SiO_2$ in place of surface-oxidized SiC, there is the swelling action similar to the above embodiments, but they are mobile because of the absence of core SiC and they disappear as in the case where a phosphate compound is used from the beginning. Therefore, they are inferior in gas seal performance to that of the present invention.

As mentioned above, the method of the present invention provides a tight gas seal which is not affected by the amount of phosphoric acid, without resorting to the capillary action of phosphoric acid. The tight gas sealing is accomplished by filling the pores in the porous material periphery of the cell constituents with fine particles of at least one of silicon carbide and silicon nitride which have undergone surface oxidation treatment, and causing particles to expand in volume through the reaction of the surface oxide of the particles with hot phosphoric acid that yields phosphate compounds, thereby clogging the pores utilizing the particle expansion. Therefore, a tight gas sealing not using the capillary action of phosphoric acid is obtained, and there is an effect that sufficient gas sealing always maintains without the influence of quantity of the phosphoric acid.

What is claimed is:

1. A method for sealing the gas of a phosphoric acid-type fuel cell which comprises filling the pores in the porous material periphery of the cell constituents with fine particles of at least one of silicon carbide and silicon nitride which have undergone surface oxidation treatment, and causing particles to expand in volume through the reaction of the surface oxide of the particles with hot phosphoric acid that yields phosphate compounds, thereby clogging the pores.

2. A method as claimed in claim 1 wherein the treatment of the surface-oxidized fine particles with hot phosphoric acid is accomplished by impregnating the fuel cell with phosphoric acid before operation of the fuel cell.

3. A method as claimed in claim 1 wherein the treatment of the surface-oxidized fine particles with hot phosphoric acid is accomplished by impregnating the fuel cell with phosphoric acid during operation of the fuel cell.

* * * * *

UNITED STATES PATENT AND TRADEMARK OFFICE
CERTIFICATE OF CORRECTION

PATENT NO.   : 4,781,727

DATED        : November 1, 1988

INVENTOR(S)  : Kenro Mitsuda et al.

It is certified that error appears in the above-identified patent and that said Letters Patent is hereby corrected as shown below:

```
Column 1, line 20, delete "220°" (first occurrence);
         line 42, "as much as" should be --to the extent--.
Column 2, line 20, "said" should be --the--;
         line 21, delete "the";
         line 38, "article" should be --particle--;
         line 39, "," should be --;--.
Column 4, line 30, "interposing" should be --superimposing--;
         line 52, "bring" should be --produce--.
Column 5, line 11, "fits" should be --is shown fitting--;
         line 12, "actual" should be --actuality--.
Column 6, line 12, "rectangular" should be --triangular--;
         line 61, after "sealing" insert --is--;
         line 62, "tains" should be --tained--.
```

Signed and Sealed this

Twenty-fourth Day of October, 1989

*Attest:*

DONALD J. QUIGG

*Attesting Officer*   Commissioner of Patents and Trademarks